(12) United States Patent
Zhu et al.

(10) Patent No.: US 11,183,179 B2
(45) Date of Patent: Nov. 23, 2021

(54) METHOD AND APPARATUS FOR MULTIWAY SPEECH RECOGNITION IN NOISE

(71) Applicant: Nanjing Horizon Robotics Technology Co., Ltd., Nanjing (CN)

(72) Inventors: Changbao Zhu, Nanjing (CN); Jianwei Niu, Nanjing (CN); Ding Liu, Nanjing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 72 days.

(21) Appl. No.: 16/510,565

(22) Filed: Jul. 12, 2019

(65) Prior Publication Data
US 2020/0027450 A1 Jan. 23, 2020

(30) Foreign Application Priority Data
Jul. 19, 2018 (CN) .......................... 201810796701.9

(51) Int. Cl.
*G10L 15/20* (2006.01)
*G10L 21/0216* (2013.01)
*G10L 21/0272* (2013.01)

(52) U.S. Cl.
CPC .......... *G10L 15/20* (2013.01); *G10L 21/0216* (2013.01); *G10L 21/0272* (2013.01); *G10L 2021/02166* (2013.01)

(58) Field of Classification Search
USPC ................................. 704/231–257, 270–275
See application file for complete search history.

(56) References Cited

U.S. PATENT DOCUMENTS

| 7,100,000 | B1 * | 8/2006 | Ittycheriah | .............. | G06F 9/505 |
| | | | | | 379/88.16 |
| 8,249,867 | B2 | 8/2012 | Young | | |
| 8,543,402 | B1 * | 9/2013 | Ma | .......................... | G10L 17/04 |
| | | | | | 704/243 |

(Continued)

FOREIGN PATENT DOCUMENTS

| JP | 2006510069 | 3/2006 |
| JP | 2011107603 | 6/2011 |
| KR | 1020090061566 | 6/2009 |
| KR | 1020110034360 | 4/2011 |
| KR | 1020110133739 | 12/2011 |

OTHER PUBLICATIONS

Extended European Search Report for Application No. EP19186916.3, dated Nov. 28, 2019, 4 pages.

(Continued)

*Primary Examiner* — Jesse S Pullias
(74) *Attorney, Agent, or Firm* — Loeb & Loeb LLP

(57) ABSTRACT

Disclosed is a method and an apparatus for recognizing speech, and the method comprises: separating an input audio signal into at least two separated signals; generating a denoised signal at a current frame; performing a preliminary recognition on each interesting signal at the current frame; and performing a recognition decision according to a recognition score of each interesting signal at the current frame. The method and apparatus of the present disclosure deeply integrate an array signal processing and a speech recognition and use multiway recognitions such that a good recognition rate may be obtained even in a case of a low signal-to-noise ratio.

16 Claims, 4 Drawing Sheets

(56) References Cited

U.S. PATENT DOCUMENTS

| | | | | |
|---|---|---|---|---|
| 8,983,832 | B2* | 3/2015 | Allen | G10L 21/0364 |
| | | | | 704/225 |
| 9,607,627 | B2* | 3/2017 | Liang | G10L 21/0208 |
| 2006/0053002 | A1 | 3/2006 | Visser | |
| 2009/0010451 | A1* | 1/2009 | Burnett | G10L 21/0208 |
| | | | | 381/92 |
| 2011/0054892 | A1* | 3/2011 | Jung | G10L 15/20 |
| | | | | 704/233 |
| 2011/0125496 | A1 | 5/2011 | Asakawa | |
| 2011/0301953 | A1 | 12/2011 | Lee | |
| 2012/0004909 | A1 | 1/2012 | Beltman | |
| 2012/0290112 | A1* | 11/2012 | Kim | G10L 25/48 |
| | | | | 700/94 |
| 2018/0033428 | A1 | 2/2018 | Kim | |

OTHER PUBLICATIONS

Roberto Togneri et al: "An Overview of Speaker Identification: Accuracy and Robustness Issues", IEEE Circuits and Systems Magazine, IEEE Service Center, New York, NY, US, vol. 11, No. 2, Jan. 1, 2011 (Jan. 1, 2011), pp. 23-61, XP011355405, ISSN: 1531-636X, DOI: 10.1109/MCAS.2011.941079.
Japanese Office Action for App. No. JP2019-132854 dated Oct. 20, 2020, 8 pages.
Korean Office Action for App. No. KR10-2019-0087618 dated Jan. 15, 2021.

* cited by examiner

METHOD AND APPARATUS FOR MULTIWAY SPEECH RECOGNITION IN NOISE

TECHNICAL FIELD OF THE DISCLOSURE

The present disclosure generally relates to a technical field of speech recognition, and more particularly, relates to a method and an apparatus for recognizing speech.

BACKGROUND

In noisy environment, such as in the presence of television interference, recognition rate of far-field speech recognition will be greatly reduced, and the far-field speech interaction is affected.

Spatial filtering may be performed through a microphone array, and single-channel speech is output and sent to speech recognizer for recognition. However, spatial filtering usually depends on sound source localization, and in a case where a signal-to-noise ratio is low, the accuracy of sound source localization itself will be significantly reduced.

SUMMARY

In one aspect, disclosed is a method for recognizing speech, the method comprising: separating an input audio signal into at least two separated signals; generating a denoised signal at a current frame based on a primary separated signal and one or more secondary separated signals selected from the at least two separated signals at the current frame of the audio signal; preliminarily recognizing each of a plurality of interesting signals at the current frame, the plurality of interesting signals at the current frame including the at least two separated signals and the denoised signal at the current frame, and each of a plurality of interesting signals at the current frame having a recognition score at the current frame associated with a result of the preliminary recognition at the current frame; and performing a recognition decision according to the recognition score of each of a plurality of interesting signals at the current frame.

In another aspect, disclosed is a computer readable non-volatile storage medium having program instructions stored thereon which may perform the above-mentioned method when executed.

In another aspect, disclosed is an apparatus for recognizing speech, and the apparatus may comprise one or more processors, the one or more processors being configured to perform the above-mentioned method when executed.

In another aspect, disclosed is an apparatus for recognizing speech, and the apparatus may comprise a splitter configured to separate an input audio signal into at least two separated signals; a signal generator configured to generate a denoised signal at a current frame based on a primary separated signal and one or more secondary separated signals selected from the at least two separated signals of the audio signal at the current frame; a recognizer configured to preliminarily recognize each of a plurality of interesting signals at the current frame, the plurality of interesting signals at the current frame including the at least two separated signals and the denoised signal at the current frame, and each of a plurality of interesting signals at the current frame having a recognition score at the current frame associated with a result of the preliminary recognition at the current frame; and a decision device configured to perform a recognition decision according to the recognition score of each of a plurality of interesting signals at the current frame.

The method and apparatus for recognizing speech according to the embodiments of the present disclosure deeply integrate array signal processing and speech recognition and use multiway recognition such that a good recognition rate may be obtained even in a case of a very low signal-to-noise ratio.

DETAILED DESCRIPTION

Examples of a method and an apparatus for recognizing speech according to embodiments of the present disclosure are described below with reference to drawings.

Figure 1:
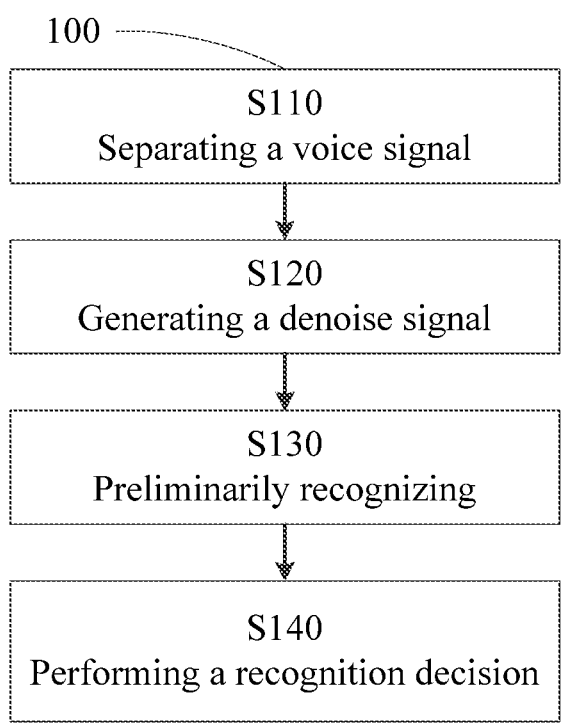
FIG. 1 shows an example of a method for recognizing speech according to an embodiment of the present disclosure.

As shown in FIG. 1, an exemplary method 100 according to an embodiment of the present disclosure may include steps S110 (separating an audio signal), S120 (generating a denoised signal), S130 (preliminarily recognizing), and S140 (performing a recognition decision).

In step S110, an input audio signal may be separated into at least two separated signals.

In one embodiment, an external voice may be obtained in real time through a pickup such as a microphone array or a pickup circuit, and converted into, for example, a digital signal through a converter such as an analog-to-digital converter or a conversion circuit, thus obtaining an input audio signal. In another embodiment, an input audio signal may be obtained through other suitable modes. The present disclosure is not limited to a specific mode or a specific apparatus for obtaining an input audio signal.

Then, in one embodiment, the input audio signal may be separated into at least two separated signals by a signal separation technology such as blind source separation or independent component analysis. In another embodiment, the input audio signal may be separated into at least two separated signals through, for example, beam-forming technology. In another embodiment, the input audio signal may be separated into at least two separated signals by using other proper signal separation technologies.

Figure 2:
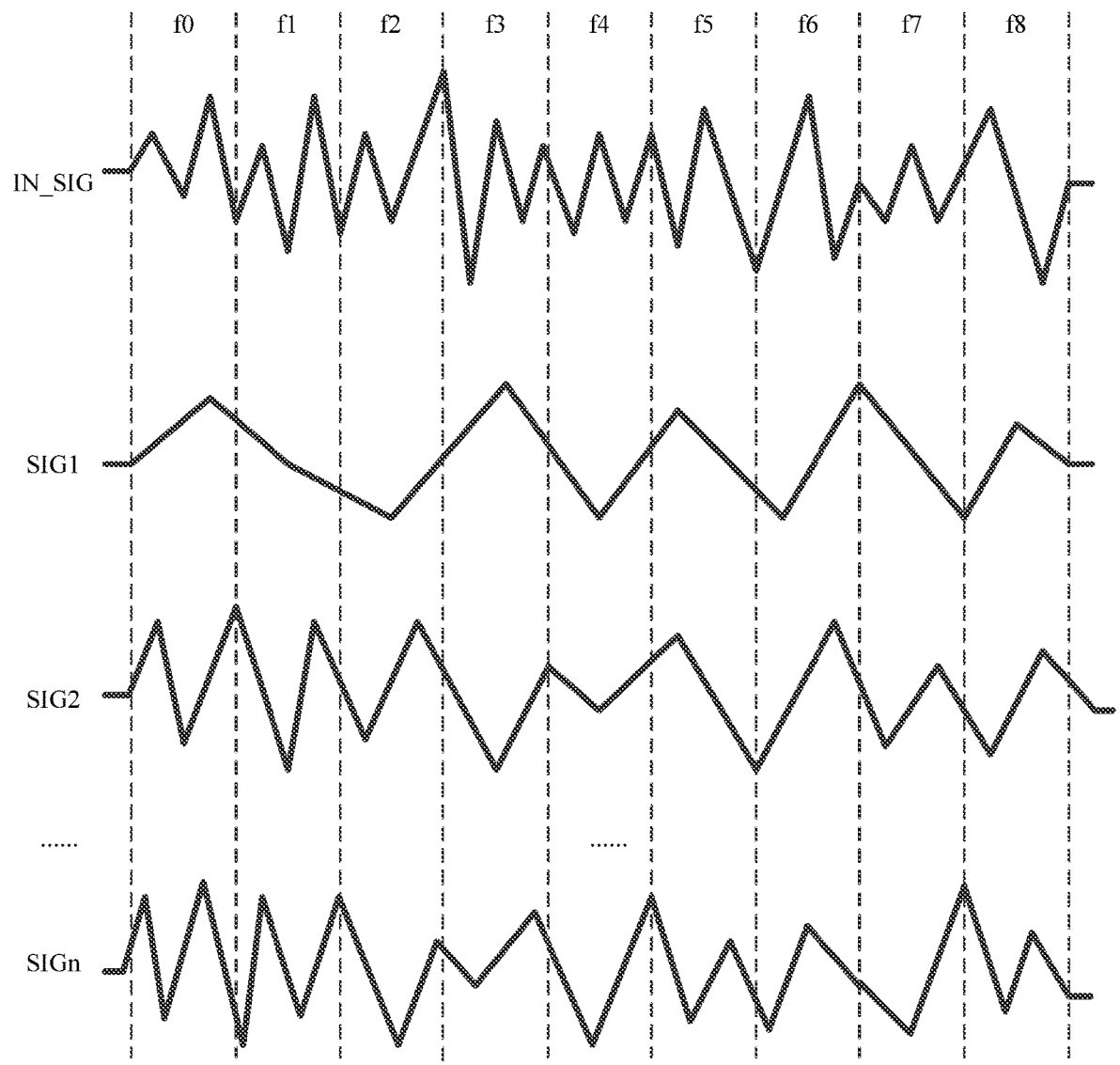
FIG. 2 shows an example of audio signal separation according to an embodiment of the present disclosure.

For example, as shown in FIG. 2, the input audio signal IN_SIG can be separated into separated signals SIG1, SIG2, . . . , SIGn (n is a natural number larger than or equal to 2). It should be understood that FIG. 2 only shows a schematic diagram of signal rather than actual waveforms of the audio signal and the corresponding separated signal.

Further, as shown in FIG. 2, the input audio signal IN_SIG may include one or more frames f0, f1, f2, f3, f4, f5, f6, f7, f8, etc. In the present disclosure, the term "current frame" may mean a signal portion corresponding to the current period (e.g. sampling period) or a signal portion being processed at the current time. For example, the current frame f3 may represent a signal portion of audio signal IN_SIG and/or each separated signal SIGi (1≤i≤n) at a period corresponding to f3. Accordingly, the preceding frame before the current frame f3 (or also referred to as "the preceding frame") represents the frame f2 immediately before the current frame f3 in time. The next frame of current frame f3 (or also referred to as "the next frame") represents the frame f4 immediately after the current frame f3 in time, and the previous frame(s) of current frame f3 (or also referred to as "the previous frame(s)") represents one or more frames that precede the current frame f3 in time (It may be continuous or discontinuous. Further it may be immediately before the current frame f3, or it may not be immediately before the current frame f3).

Then, in step S120, generating a denoised signal at the current frame based on a primary separated signal and one or more secondary separated signals selected from the at least two separated signals separated in step S110 at the current frame of audio signal.

In one embodiment, a recognition score at a preceding frame of the primary separated signal selected from the above at least two separated signals at the current frame may be larger than or equal to the recognition score at the preceding frame of any other separated signals. For example, if the recognition score of SIG2 of SIG1 to SIGn at frame f3 is larger than or equal to the recognition score of any other separated signals of SIG1 to SIGn, then at the beginning of frame f4, SIG2 may be selected as the primary separated signal at frame f4, and one or more of any other separated signals of SIG1 to SIGn may be used as secondary separated signals at frame f4.

The recognition score of a signal represents, for example, the approaching degree of the recognition result for the signal to audio signal IN_SIG or the actual contents represented by audio signal IN_SIG, and the higher the recognition score, the higher the approaching degree. The recognition score for each separated signal at each frame will be described in more detail in the following.

Then, in one embodiment, each separated signal SIGi may be analyzed to obtain its frequency spectrum and power spectrum. For example, the frequency spectrum of each separated signal SIGi may be obtained through a timely Fourier analysis, and the power spectrum of each separated signal SIGi may be further obtained based on the frequency spectrum of each separated signal SIGi.

Further, a denoised factor or gain may be determined according to the power spectrum of the selected primary separated signal and the power spectrum of the selected one or more secondary separated signals.

In one embodiment, a power ratio may be firstly determined, and then the denoised factor or gain may be calculated or obtained according to the power ratio of primary signal and secondary signal. For example, the power ratio may be a power ratio obtained according to the power spectrum of the selected primary separated signal and the power spectrum of one secondary separated signal of the selected one or more secondary separated signals. In a further example, the power ratio may be a power ratio obtained according to the power spectrum of the selected primary separated signal and the average power spectrum of all the selected secondary separated signals. In a further example, the power ratio may be a power ratio obtained according to the power spectrum of the selected primary separated signal and the average power spectrum of a plurality of secondary separated signals of all the selected secondary separated signals.

In one embodiment, the denoised factor or gain g may be determined to be, for example, g=a/(1+a), where a is a previously obtained power ratio. In a further embodiment, the denoised factor or gain g may be determined by other modes according to the power ratio, such that the larger the power ratio, the larger the denoised factor or gain g.

Then, the denoised signal at the current frame may be obtained according to the denoised factor or gain g and the frequency spectrum of the primary separated signal. In one embodiment, the denoised factor or gain g may be multiplied by the frequency spectrum of the primary separated signal, and may be performed the synthetic transformation to obtain the denoised signal at the current frame. In a further embodiment, the denoised signal (marked below as SIG_DN) at the current frame may be obtained through any proper denoised technology according to the denoised factor or gain g and the frequency spectrum of the primary separated signal.

Then, at least the above at least two separated signals SIG1 to SIGn and the denoised signal SIG_DN at the current frame may be used as a plurality of (e.g., n+1) interesting signals at the current frame and it proceeds to step S130 to perform preliminary recognition according to each of the plurality of interesting signals at the current frame, wherein each of a plurality of interesting signals at the current frame has a recognition score at the current frame associated with a result of the preliminary recognition at the current frame.

In one embodiment, the recognition score of each separated signal at a preceding frame may be recorded, for example, so as to be used at least at a next frame. For example, at frame f3, at least the corresponding recognition score of each separated signal SIGi at least at this frame f3 may be recorded; then, at frame f4, the primary separated signal at frame f4 may be selected from separated signal SIGi according to the recognition score recorded at frame f3, and then the denoised signal at frame f4 may be obtained.

In step S130, in one embodiment, for each of a plurality of interesting signals which includes separated signals SIG1 to SIGn and the denoised signal SIG_DN at the current frame, an acoustic score at the current frame may be determined by an acoustic model.

In different embodiments, the acoustic model may be any proper acoustic model SND constructed on the basis of such as Hidden Markov Model (HMM), Deep Neural Network (DNN), and the like. The present disclosure is not limited to any specific acoustic model. Accordingly, the acoustic score $S\_SND_j$ (for example, 1≤j≤n+1) of each interesting signal may be formally represented as $S\_SND_j=SND(IS_j|\theta^{SND})$, where $IS_j$ represents an interesting signal, and may be, for example, any separated signal SIGi or denoised signal SIG_DN at the current frame; $\theta^{SND}$ represents model parameters of acoustic model SND, such as model parameters after training in advance or online training.

Then, for each interesting signal $IS_j$, decoding may be performed on the interesting signal $IS_j$ according to the acoustic score $S\_SND_j$ of the interesting signal $IS_j$ at the current frame. According to different embodiments, decoding may be performed by using any proper decoding technique such as Viterbi decoding and dynamic programming decoding. For example, for a command word that may include one or more predetermined words, one or more command word models such as a deep learning network or a Hidden Markov Model may be used to recognize and score interesting signal $IS_j$.

In one embodiment, the decoding result obtained by decoding each interesting signal $IS_j$ at the current frame may include a corresponding decoding score $S\_DEC_j$ for each interesting signal $IS_j$, the higher the decoding score $S\_DEC_j$ may represent that the decoding result of the corresponding interesting signal $IS_j$ is more likely to be close to all represented actual semantic of audio signal IN_SIG.

In one embodiment, step S130 may include determining a confidence level that the decoding result of each of the plurality of interesting signals at the current frame matching a predetermined sentence including one or more predetermined words. In this embodiment, the recognition score of each of a plurality of interesting signals at the current frame may depend on the confidence level determined at the current frame.

For example, in a case of recognizing a wake-up word or a command word, decoding score $S\_DEC_j$ may correspond to or be based on the confidence level or degree that the decoding result of corresponding interesting signal $IS_j$ at the current frame matches the predetermined sentence including one or more predetermined words, and the recognition score $S\_ID_j$ of interesting signal $IS_j$ at the current frame may be determined according to the confidence level, for example, the confidence level is used as the recognition score $S\_ID_j$ of interesting signal $IS_j$ at the current frame.

In another embodiment, step S130 may further include performing a natural language processing on the decoding result of each of a plurality of interesting signals at the current frame. In this embodiment, the recognition score of each of a plurality of interesting signals at the current frame may depend on the score of the natural language processing at the current frame.

For example, in the case of general speech recognition, the natural language processing may be further performed for the decoding result of each interesting signal $IS_j$ at the current frame, and the score of natural language processing $S\_NLP_j$ of interesting signal $IS_j$ at the current frame may be obtained. For example, the corresponding natural language processing score $S\_NLP_j$ may be used as the recognition score $S\_ID_j$ of interesting signal $ISj$ at the current frame, or the recognition score $S\_ID_j$ of interesting signal $IS_j$ at the current frame may be determined based on the corresponding natural language processing score.

As described above, the recognition score of each interesting signal $IS_j$ at the current frame may be recorded for use at the next frame.

Then, exemplary method 100 may proceed to step S140, to perform the recognition decision according to the recognition score of each interesting signal $IS_j$ at the current frame.

For example, in a case of recognizing a wake-up word including one predetermined word, or in a case of recognizing a command word including one or more predetermined words, or in a case of general speech recognition, the preliminary recognition result at the current frame of a first interesting signal $IS_k$ ($1 \le k \le n+1$) satisfying one or more predetermined conditions in all interesting signals $\{IS_j, 1 \le j \le n+1\}$ at the current frame may be determined as the recognition result for audio signal IN_SIG at the current frame.

According to different embodiments, one or more predetermined conditions that may be considered in step S140 may include, but are not limited to, for example, one or more of the following conditions:

recognition score $S\_ID_k$ of the first interesting signal $IS_k$ at the current frame is larger than or equal to recognition score $S\_ID_m$ at the current frame of any other interesting signal $IS_M$ at the current frame ($1 \le m \le n+1$, and $m \ne k$);

hit times of a predetermined word(s) corresponding to the preliminary recognition result of the first interesting signal $IS_k$ at the current frame is larger than or equal to hit times of a predetermined word(s) corresponding to the preliminary recognition result of any other interesting signal $IS_m$ at the current frame;

recognition score $S\_ID_k$ of the first interesting signal $IS_k$ at the current frame is larger than or equal to a first threshold TH1, where the first threshold TH1 may be set as any proper value as needed.

It should be understood that the above predetermined conditions are merely examples, but not all possible predetermined conditions. For example, in a case of recognizing a wake-up word including one predetermined word, the result of recognition for audio signal IN_SIG at the current frame is determined as indicating to perform a wake-up operation may include, but not limited to, one or more of the following example conditions:

the first interesting signal $IS_k$ exists in all interesting signals $\{IS_j, 1 \le j \le n+1\}$ at the current frame, and recognition score $S\_ID_k$ of the first interesting signal $ISk$ at the current frame is larger than or equal to the first threshold TH1;

the recognition score $S\_ID_r{'}$ at the current frame of each interesting signal $IS_r{'}$ in predetermined number N1 (e.g. 100 or more) of interesting signal(s) $\{IS_r{'}, 1 \le r \le N1\}$ of all interesting signals $\{IS_j, 1 \le j \le n+1\}$ at the current frame is larger than or equal to a second threshold TH2;

the recognition score of denoised signal SIG_DN at the current frame is larger than or equal to a third threshold TH3, and the recognition score of each separated signal $SIGi$ at the current frame is larger than or equal to a fourth threshold TH4;

the recognition score $S\_ID_{SIG\_DN}$ of denoised signal SIG_DN at the current frame is larger than or equal to a fifth threshold TH5, and there is separated signal $SIGp$ ($1 \le p \le n$), such that the recognition score $S\_IDsm_p$ of separated signal $SIGp$ at the current frame is larger than or equal to the recognition scores $S\_ID_{SIGq}$ of any other separated signal $SIGq$ ($1 \le q \le n$ and $q \ne p$) at current frame, further $|S\_ID_{SIG\_DN}-S\_ID_{SIGp}|<$ a sixth threshold TH6 and $S\_ID_{SIGp} \ge$ a seventh threshold TH7.

According to different embodiments, values of the first threshold TH1 to the seventh threshold TH7 may be set as any proper values as needed.

In one embodiment, in a case where the recognition result for audio signal IN_SIG at the current frame is determined to be an instruction to perform a wake-up operation according to a predetermined condition, exemplary method 100 or step S140 of exemplary method 100 may further include performing the wake-up operation, thus a device in the sleep or standby state, for example, turns on some or all functions.

In exemplary method 100 shown in FIG. 1, multiway recognition is adopted, and feedback information of a preceding frame is considered in processing of each frame, such that a good recognition rate may be obtained even in a case of low signal-to-noise ratio.

Figure 3:
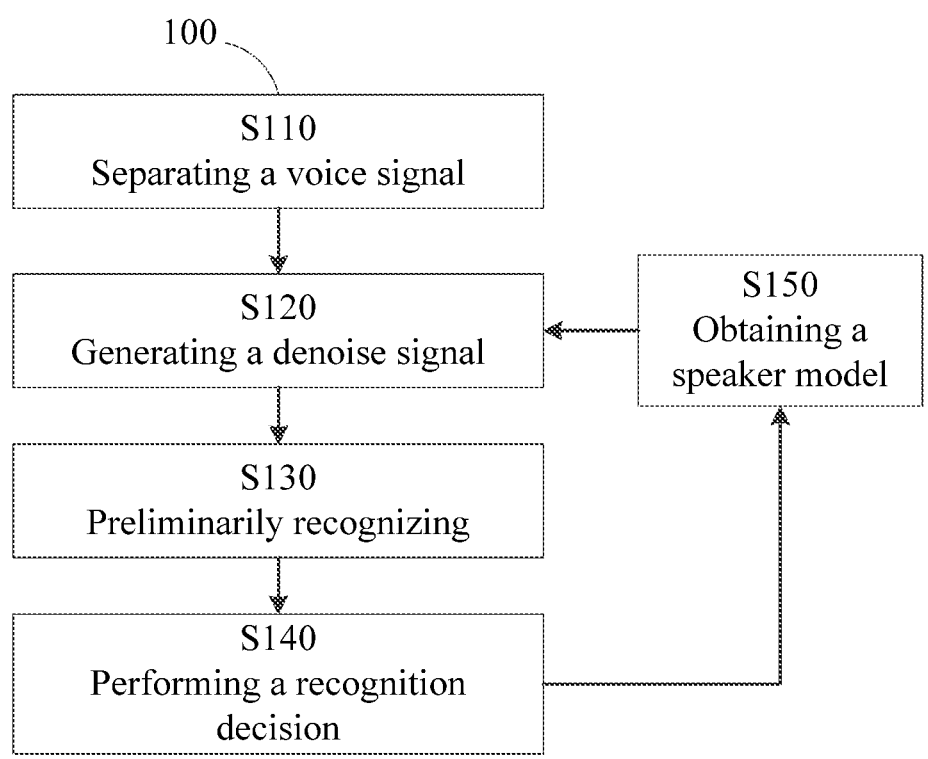
FIG. 3 shows another example of a method for recognizing speech according to an embodiment of the present disclosure.

As shown in FIG. 3, exemplary method 100 further comprises step S150 for obtaining a speaker model. Accordingly, in step S120, feedback information of the speaker model in preceding frame may also be considered.

In one embodiment, a probability of the selected primary separated signal at the current frame being associated with the speaker at the preceding frame as determined by the speaker model is larger than or equal to a probability of any other separated signals being associated with the speaker at the preceding frame as determined by the speaker model, and is larger than or equal to a specific threshold.

For example, for each separated signal $SIGi$ in signals SIG1 to SIGn, the probability $P_{SIGi}$ of each separated signal being associated with the speaker may be determined by the speaker model at frame f3, if the probability $P_{SIG2}$ of separated signal SIG2 is larger than the probability $P_{SIGk}$ of any other separated signal SIGk, then at the beginning of frame f4, SIG2 may be selected as the primary separated signal at frame f4 and one or more of any other separated signals (1≤k≤n and k≠2) in SIG1 to SIGn may be used as secondary separated signals at frame f4.

In order to obtain such a speaker model, in step S150, a feature of a speaker may be determined at least according to the recognition result for audio signal IN_SIG at the current frame, and a speaker model is trained by the speaker feature.

According to different embodiments, the speaker model may be any proper speaker model, such as an artificial neural network speaker model of a type of counter propagation, a vector quantization speaker model based on the genetic algorithm, etc. According to the adopted speaker model, the details of speaker feature that need to be determined may be determined. The present disclosure is not limited to a specific speaker model and a specific speaker feature.

In one embodiment, a corresponding previous interesting signal at the time of at least one previous frame before the current frame may also be recorded, and the preliminary recognition result of each previous interesting signal at a corresponding previous frame is a recognition result for audio signal IN_SIG at the corresponding previous frame.

For example, assuming that the current frame is f4, it may record interesting signal $IS_{f0}$ at frame f0 (an interesting signal satisfying the above one or more predetermined conditions in separated signals SIG1 to SIGn and a denoised signal at frame f0), interesting signal $IS_{f1}$ at frame f1 (an interesting signal satisfying the above one or more predetermined conditions in separated signals SIG1 to SIGn and the denoised signal at frame f01), interesting signal $IS_{f2}$ at frame f2 (an interesting signal satisfying the above one or more predetermined conditions in separated signals SIG1 to SIGn and the denoised signal at frame f2), and interesting signal $IS_{f3}$ at frame f3 (an interesting signal satisfying the above one or more predetermined conditions in separated signals SIG1 to SIGn and the denoised signal at frame f3).

Then, when determining the speaker feature, the preliminary recognition result of each previous interesting signal at the corresponding previous frame may also be considered.

For example, the speaker feature may be determined according to the preliminary recognition result of interesting signal $IS_{f0}$ at frame f0 (i.e. the recognition result for audio signal IN_SIG at frame f0), the preliminary recognition result of interesting signal $IS_{f1}$ at frame f1 (i.e. the recognition result for audio signal IN_SIG at frame f1), the preliminary recognition result of interesting signal $IS_{f2}$ at frame F2 (i.e. the recognition result for audio signal IN_SIG at frame f2), the preliminary recognition result of interesting signal $IS_{f3}$ at frame f3 (i.e. the recognition result for audio signal IN_SIG at frame f3), and the preliminary recognition result of interesting signal $IS_{f4}$ at frame f4.

Figure 4:
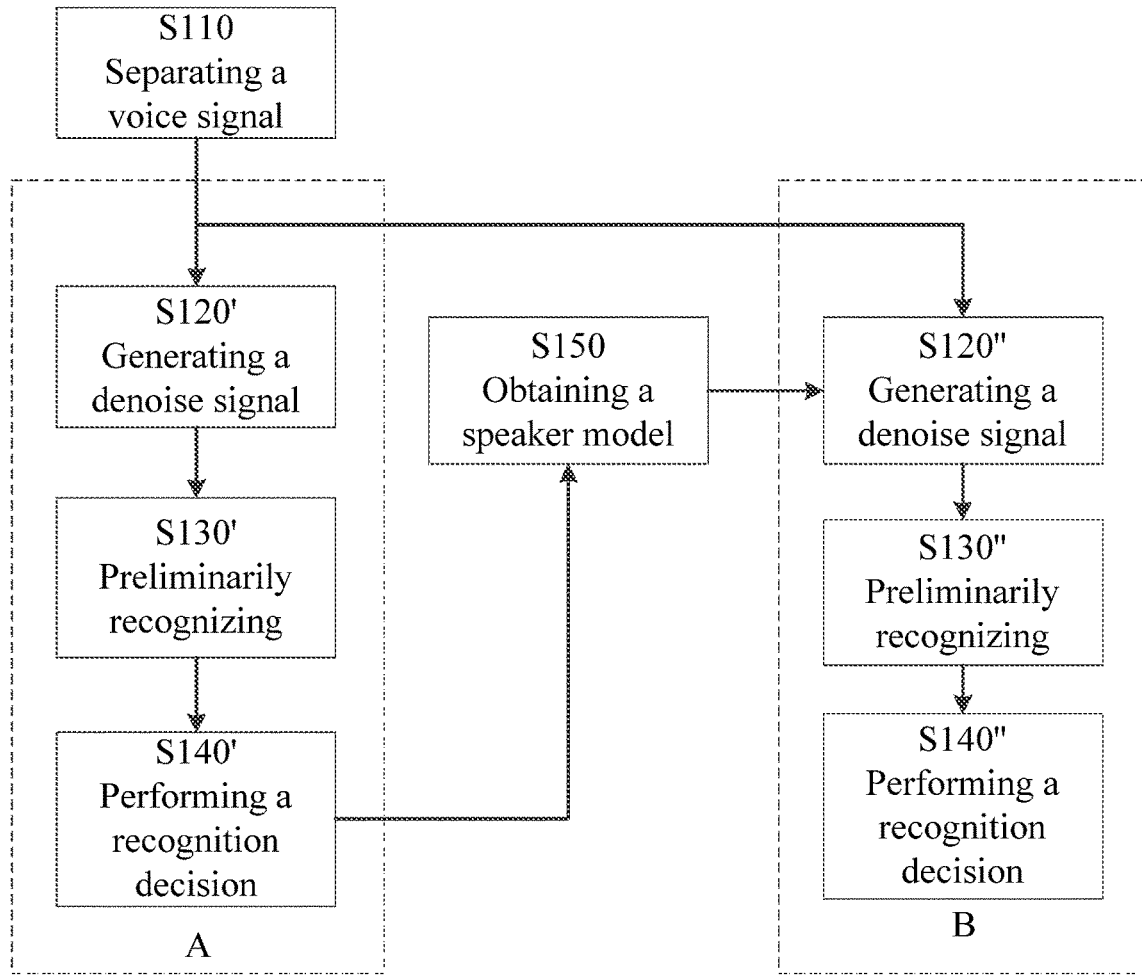
FIG. 4 shows another example of a method for recognizing speech according to an embodiment of the present disclosure.

FIG. 4 illustrates another example of a method according to an embodiment of the present disclosure, wherein step S110 may be the same as step S110 shown in FIG. 1 or FIG. 3, and step S150 may be the same as step S150 shown in FIG. 3, and the repeating parts will not be described again.

In example of FIG. 4, block A may correspond to a wake-up process, and steps S120', S130' and S140' of block A may respectively correspond to steps S120, S130 and S140 of example of FIG. 1, however it may place more emphasis on the recognition for wake-up words, and the repeated part will not be described again. Accordingly, step S140' may include performing a wake-up operation and may be referred to as a "wake-up decision", and step S130' may also be referred to as a "wake-up recognition".

After a wake-up operation is performed through step S140', it may be converted from block A to block B, wherein block B may correspond to a general recognition process (e.g., a command word recognition and a general speech recognition), and steps S120", S130", and S140" of block B may respectively correspond to steps S120, S130 and S140 in the example of FIG. 3, and the repeating part will not be described again.

In the example of FIG. 3 or FIG. 4, the method according to the embodiment of the present disclosure also considers determining association with a speaker depending on a speaker model, thus allowing feature information of the speaker to be further integrated in a speech control and interaction stage and further improving the recognition rate.

In one embodiment, the program instructions being capable of performing various steps of the above method may be stored or implemented on one or more computer readable non-temporary storage medium, such that such non-temporary storage medium may provide corresponding program instructions when read by a computer or any other computing device (e.g., processor), and it enables a computer or any other computing device to perform corresponding operation according to the program instructions being read. According to different embodiments, the program instructions may be implemented or stored on non-temporary storage medium in various forms, such as source code, binary code, intermediate code, and the like, or in various combination.

Figure 5:
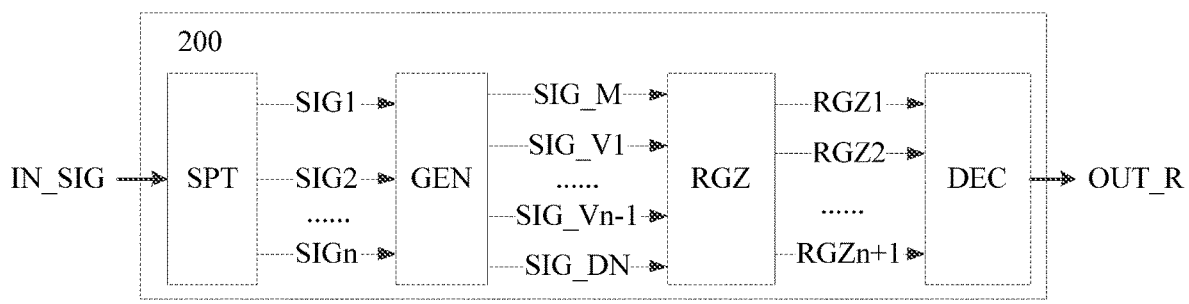
FIG. 5 shows an example of an apparatus for recognizing speech according to an embodiment of the present disclosure.

FIG. 5 shows an exemplary apparatus 200 capable of applying the method according to an embodiment of the present disclosure, which may comprise a splitter SPT, a signal generator GEN, a recognizer RGZ, and a decision device DEC.

In one embodiment, the splitter SPT may include one or more processors, for example, a general processor or processing device such as central processing unit (CPU) and a field programmable gate array (FPGA), or any other special processor or processing device. In one embodiment, the splitter SPT (e.g., a processor in the splitter SPT) may be configured to separate an input audio signal IN_SIG into at least two separated signals SIG1, SIG2, . . . , SIGn. In one embodiment, the splitter SPT or processor therein may be configured to perform, for example, step S110 of the exemplary method 100.

In one embodiment, the signal generator GEN may include one or more processors, for example a general processor or processing device such as a CPU and a FPGA, or any other special processor or processing device. In one embodiment, the signal generator GEN may be configured to generate a denoised signal SIG_DN at the current frame based on the primary separated signal SIG_M and one or more secondary separated signals SIG_V1, . . . , SIG_Vn−1 selected from separated signals SIG1, SIG2, . . . , SIGn at the current frame. In one embodiment, the signal generator GEN or processor therein may be configured to perform, for example, step S120 of the exemplary method 100.

In one embodiment, the recognizer RGZ may include one or more processors, for example a general processor or processing device such as a CPU and a FPGA, or other special processor or processing device. In one embodiment, the recognizer RGZ may be configured to perform a preliminary recognition on each of a plurality of interesting signals at the current frame, and the plurality of interesting signals at the current frame may include separated signals SIG1, SIG2 . . . , SIGn and the denoised signal SIG_DN at the current frame, and each of the plurality of interesting signals at the current frame has a recognition score at the current frame associated with the result RGZj ($1 \leq j \leq n+1$) of preliminary recognition at the current frame. In one embodiment, the recognizer RGZ or processor therein may be configured to perform, for example, step S130 of the exemplary method 100.

In one embodiment, the decision device DEC may include one or more processors, for example a general processor or processing device such as a CPU and a FPGA, or any other special processor or processing device. In one embodiment, the decision device DEC may be configured to perform a recognition decision according to the recognition score of each of a plurality of interesting signals at the current frame (according to different embodiments, it may be RGZj or included in RGZj) to obtain the recognition result OUT_R for an input audio signal IN_SIG at the current frame. In one embodiment, the decision device DEC or processor therein may be configured to perform, for example, step S140 of the exemplary method 100.

It should be understood that the structure shown in FIG. 5 is merely exemplary and not limiting. The apparatus according to the embodiment of the present disclosure may also have other component and/or structure.

For example, the exemplary apparatus 200 may further comprise a microphone array for serving as a pickup or pickup circuit for obtaining external voice. In addition, it may also comprise components such a converter or conversion circuit such as an analog-to-digital converter and filter and the like.

For example, an apparatus according to an embodiment of the present disclosure may include one or more processors (for example, a general processor or processing device such as a CPU and a FPGA and/or a special processor or processing device), and such one or more processors may be configured to perform at least a method according to an embodiment of the present disclosure when starting, such as exemplary method 100.

For example, the apparatus according to an embodiment of the present disclosure may further comprise an I/O interface, a network interface, and/or a memory, to perform information/data interaction with other components or apparatus in a wired mode or wireless mode.

For example, according to different embodiments, the memory in an apparatus may include a computer readable and writable storage medium in various forms, for example, a volatile memory and/or a non-volatile memory. Volatile memory may include, for example, random access memory (RAM) cache, on-chip memory, etc. Non-volatile memory may include, for example, a read only memory (ROM), a hard disk, a flash memory, etc. The readable and writable storage medium may include, but not limited to, an electric, a magnetic, an optical, an electromagnetic, an infrared, or a semiconductor system, apparatus, or device or any combination of the above. In one embodiment, the memory may store program instructions for instructing one or more processors of the apparatus to perform steps of the method according to embodiments of the present disclosure.

Unless otherwise required clearly in the context, throughout the description and claims, the wordings such as "comprise" and "include" are to be construed in an inclusive sense, as opposed to an exclusive or exhaustive sense, that is to say, in a sense of "including but not limited to". Additionally, the words "herein", "above", "below", and words of similar import being used in this disclosure, shall refer to this disclosure as a whole and not to any particular portions of this disclosure. Where the context permits, words in the above Detailed Description using the singular or plural number may also include the plural or singular number respectively. For example, "first obstacle" or "second obstacle" may mean one or more "first obstacles" or "second obstacles", and "another" may also mean another one or more. The word "or" in reference to a list of two or more items, that word covers all of the following interpretations of the word: any of the items in the list, all of the items in the list, and any combination of the items in the list. In addition, the terms "first", "second" and the like are intended to be used for distinction, rather than to emphasize order or importance.

While some embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and apparatus described herein may be made without departing from the spirit of the disclosure.

What is claimed is:

1. A method for recognizing speech, comprising:
   separating an input audio signal obtained through a pickup or pickup circuit into at least two separated signals by a signal separation technology;
   generating a denoised signal at a current frame based on a primary separated signal and one or more secondary separated signals selected from the at least two separated signals of the audio signal at the current frame;
   performing a preliminary recognition on each of a plurality of interesting signals at the current frame, the plurality of interesting signals at the current frame including the at least two separated signals and the denoised signal at the current frame, and each of the plurality of interesting signals at the current frame having a recognition score at the current frame associated with a result of the preliminary recognition at the current frame; and
   performing a recognition decision according to the recognition score of each of the plurality of interesting signals at the current frame;
   wherein the primary separated signal selected at the current frame has a recognition score at a preceding frame of the audio signal larger than or equal to the recognition score of any other separated signal in the at least two separated signals at the preceding frame.

2. The method of claim 1, wherein the preliminary recognition comprises:
   determining an acoustic score of each of the plurality of interesting signals at the current frame; and
   decoding each of the plurality of interesting signals at the current frame based on the acoustic score of each of the plurality of interesting signals at the current frame, respectively.

3. The method of claim 2, wherein the preliminary recognition further comprises:
   determining a confidence level of the decoding result of each of the plurality of interesting signals at the current frame matching a predetermined sentence including one or more predetermined words, the recognition score of each of the plurality of interesting signals at the current frame depending on the confidence level determined at the current frame.

4. The method of claim 2, wherein the preliminary recognition further comprises:

performing a natural language processing on the decoding result of each of the plurality of interesting signals at the current frame, the recognition score of each of the plurality of interesting signals at the current frame depending on a score of the natural language processing at the current frame.

5. The method of claim 1, wherein the recognition decision comprises:
determining a result of preliminary recognition of a first interesting signal satisfying a predetermined condition in the plurality of interesting signals at the current frame as the recognition result for the audio signal at the current frame.

6. The method of claim 5, wherein the predetermined condition comprises one or more of following conditions:
the recognition score of the first interesting signal at the current frame is larger than or equal to the recognition score of any other of the plurality of interesting signals at the current frame;
predetermined word hit times corresponding to the preliminary recognition result of the first interesting signal at the current frame are larger than or equal to that corresponding to the preliminary recognition result of any other of the plurality of interesting signals at the current frame; and
the recognition score of the first interesting signal at the current frame is larger than or equal to a first threshold.

7. The method of claim 1, wherein the current recognition decision comprises:
determining the recognition result for the audio signal at the current frame as an instruction to perform a wake-up operation according to a predetermined condition.

8. The method of claim 7, wherein the predetermined condition comprises one or more of following conditions;
the plurality of interesting signals at the current frame include a first interesting signal which has a recognition score at the current frame larger than or equal to a first threshold;
the recognition score of each of a first predetermined number of interesting signals in the plurality of interesting signals at the current frame is larger than or equal to a second threshold;
the recognition score of the denoised signal at the current frame is larger than or equal to a third threshold, and the recognition score of each of the at least two separated signals at the current frame is larger than or equal to a fourth threshold; and
the recognition score of the denoised signal at the current frame is larger than or equal to a fifth threshold, and a difference between the recognition score of the denoise signal at the current frame and the recognition score of a first separated signal of the at least two separated signals at the current frame is less than a sixth threshold, the recognition score of the first separated signal at the current frame is larger than or equal to the recognition scores of any other separated signal of the at least two separated signals at the current frame and is larger than or equal to a seventh threshold.

9. The method of claim 1, further comprising:
determining a feature of a speaker at least according to the recognition result for audio signal at the current frame; and
training a speaker model by the speaker feature.

10. The method of claim 9, further comprising:
recording previous interesting signals at the time of at least one previous frame before the current frame, and the preliminary recognition result of each previous interesting signal at a corresponding previous frame is a recognition result for the audio signal at the corresponding previous frame; and
determining the speaker feature according to the preliminary recognition result of each previous interesting signal at the corresponding previous frame.

11. The method of claim 9, wherein a probability of the primary separated signal selected at the current frame being associated with the speaker at the previous frame as determined by the speaker model is larger than or equal to a probability of any other of the at least two separated signals being associated with the speaker at the preceding frame as determined by the speaker model, and is larger than or equal to a first threshold.

12. The method of claim 1, wherein generating a denoised signal at the current frame comprises:
analyzing each of the at least two separated signals to obtain its frequency spectrum and power spectrum;
determining a denoised factor according to the power spectrum of the primary separated signal and the power spectrum of the one or more secondary separated signals; and
obtaining the denoised signal at the current frame according to the denoised factor and the frequency spectrum of the primary separated signal.

13. The method of claim 12, wherein determining the denoised factor comprises:
determining a power ratio according to the power spectrum of the primary, separated signal and the power spectrum of the one or more secondary separated signals; and
determining the denoised factor according to the power ratio such that the larger the power ratio, the larger the denoised factor.

14. An apparatus for recognizing speech, comprising:
a splitter configured to separate an input audio signal obtained through a pickup or pickup circuit into at least two separated signals by a signal separation technology;
a signal generator configured to generate a denoised signal at a current frame based on a primary separated signal and one or more secondary separated signals selected from the at least two separated signals of the audio signal at the current frame;
a recognizer configured to perform a preliminary recognition on each of a plurality of interesting signals at the current frame, the plurality of interesting signals at the current frame including the at least two separated signals and the denoised signal at the current frame, and each of the plurality of interesting signals at the current frame having a recognition score at the current frame associated with the result of preliminary recognition at the current frame; and
a decision device configured to perform a recognition decision according to the recognition score at the current frame of each of a plurality of interesting signals at the current frame;
wherein the primary separated signal selected at the current frame has a recognition score at a preceding frame of the audio signal larger than or equal to the recognition score of any other separated signal in the at least two separated signals at the preceding frame.

15. An apparatus for recognizing speech, comprising:
one or more processors configured to perform at least the method of claim 1 when starting.

16. A computer readable non-transitory storage medium having program instructions stored thereon which performs the method of claim 1 when executed.

\* \* \* \* \*